United States Patent [19]

Connor

[11] Patent Number: 4,530,571
[45] Date of Patent: Jul. 23, 1985

[54] MIRROR

[75] Inventor: John Connor, Coventry, England

[73] Assignee: ClearPlas Limited, Coventry, England

[21] Appl. No.: 471,189

[22] Filed: Mar. 1, 1983

[30] Foreign Application Priority Data

Mar. 5, 1982 [GB] United Kingdom ............... 8206512
Oct. 15, 1982 [GB] United Kingdom ............... 8229588

[51] Int. Cl.³ .............................................. G02B 5/08
[52] U.S. Cl. .................................... 350/629; 248/466
[58] Field of Search ......... 350/288, 6.6, 310, 289-309; 248/466, 467-498

[56] References Cited

U.S. PATENT DOCUMENTS 4,306,770 12/1981 Marhauer ........................ 248/467

FOREIGN PATENT DOCUMENTS 1066839 4/1967 United Kingdom ............... 350/288

Primary Examiner—Bruce Y. Arnold
Assistant Examiner—Bruce S. Shapiro
Attorney, Agent, or Firm—Gifford, VanOphem Sheridan, Sprinkle & Nabozny

[57] ABSTRACT

A mirror made of a synthetic plastics material in the shape of a shallow tray having a base which is metallized on its internal or external surface. The shallow tray has a rim integral with the periphery of the base. The shape of the cross-section of the rim enables the peripheral edge at the front of the mirror to be convexly rounded to a required radius greater than the thickness of the base. The shape of the cross-section of the rim also serves to hold the base from distortion and so maintains the optical properties of the mirror.

5 Claims, 6 Drawing Figures

MIRROR

BACKGROUND OF THE INVENTION

The invention relates to a mirror and is particularly, but not exclusively, concerned with a mirror made of a synthetic plastics material to be mounted on a pivotally-mounted sun visor of a motor vehicle. Such a mirror is usually called a vanity mirror. Alternatively the mirror may be an interior rear-view mirror for use in a motor vehicle.

Vanity or interior rear-view mirrors have been made hitherto of silvered glass but these are dangerous as they can easily be broken by impact by a person, usually the front passenger or the driver, in a vehicle involved in a collision.

Mirrors have been made of a synthetic plastics material, for example an acrylic resin, which is metallised on its rear surface by vacuum deposition or other metallising process. Plastic mirrors are not readily broken and if they do break will not splinter into sharp pieces like a glass mirror.

Recently regulations have been promulgated making it necessary for fittings and parts in a region of a motor vehicle where they could be impacted by the head of the driver or a passenger in the event of a collision to have a rounded edge of a minimum radius. Currently this minimum external radius is 3.20 mm. A typical plastic mirror has a thickness of only approximately 2 mm. and so it is not possible to produce a rounded edge with a radius of at least 3.20 mm. Increasing the thickness of the mirror to 3.20 mm. or more over the whole area of the mirror would not be practicable as the mirror would be thick and therefore brittle. Also the manufacture of the mirror would be too costly as the quantity of material used and also the time taken to mould the mirror would both be prohibitively increased.

SUMMARY OF THE PRESENT INVENTION

An object of the invention is to produce a plastic mirror having a comparatively thin reflective part and which is formed with a rounded peripheral front edge having a minimum radius as required by regulations, currently 3.20 mm.

According to the invention, a mirror is made of a synthetic plastics material in the shape of a shallow tray or dish having a base which is metallised on its internal or external surface, to provide either second or first surface reflection, the shallow tray or dish having a peripheral wall or rim upstanding from the base and having a height sufficient to permit the peripheral edge at the front of the mirror to be convexly rounded to a required radius greater than the thickness of the base.

As aforesaid, it is desirable that the base of the shallow tray or dish on which the reflective surface is formed should be thin, for example approximately 2 mm. It is also desirable that the thickness of the mirror throughout the base and the rim shall be substantially uniform. Another requirement is that the base should not become deformed or distorted as otherwise the optical properties of the mirror would be affected. The rim should therefore have a cross-sectional shape whereby it will provide rigidity of the base without producing distortion either during or after moulding or during use as a result of temperature or humidity changes.

In a preferred embodiment according to the invention, the mirror is formed with a rim of substantially the same thickness of plastics material from at least a marginal region of the base of the mirror and throughout the rim, the rim being defined by a first peripherally-inner wall portion thereof extending forwardly, with respect to the mirror from the base thereof, a crest portion curving peripherally outwardly of said first portion to provide at its outer surface said required minimum convex radius of curvature and a second peripherally outer wall portion spaced from said first portion and terminating in substantially the same plane as the rear surface of the base of the mirror.

The substantially uniform thickness of plastics material may extend throughout the base or the central portion of the base may be slightly thicker than said marginal region by the provision of a stepped surface extending forwardly from the front face of the central portion of the base within said marginal region thereof, rearwardly from the rear face of said central portion of the base or on both said front and rear faces of said central portion of the base. The thicker central portion of the base where provided imparts greater rigidity to the base, thereby to ensure optical stability.

Conveniently the mirror is vacuum or pressure moulded to its required finished shape of tray-like or dished form having a convex front peripheral edge and is then metallised on the internal or external surface of its base. The metallising may be performed by vacuum deposition of a reflective metallic layer. The metallic layer may be coated by a protective layer. For second surface reflection the protective layer may be a lacquer or an adhesive sheet or label. For first surface reflection the protective layer would be a transparent lacquer or other transparent coating. The corners of the mirror, as viewed in plan may also be convexly curved. The acrylic resin or other plastics material may be tinted.

BRIEF DESCRIPTION OF THE DRAWINGS

By way of example, two embodiments of a moulded synthetic plastics mirror, e.g., of an acrylic resin, are shown in the accompanying drawings, in which.

DETAILED DESCRIPTION OF THE PREFERRED EMBODIMENT

Figure 1:
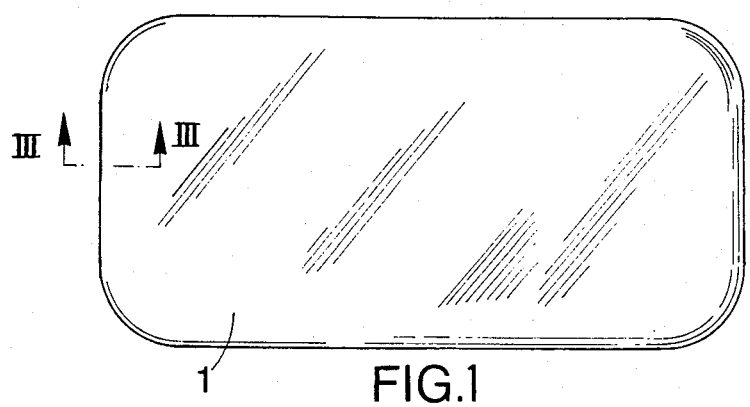
FIG. 1 is a plan view from the front of the first mirror.

As shown in FIG. 1, the mirror is substantially rectangular in plan and has convexly-curved corners of curvature, as viewed in plan, greater than the minimum permitted radius, currently 3.20 mm. The mirror may be of any other required shape, as viewed in plan.

In accordance with the invention, the mirror is moulded in the shape of a shallow tray or dish. This is shown in FIG. 3. The thickness of the base 1 of the tray or dish is in this example 1.70 mm and is constant in order to provide true reflection through the plastics material from the internal face of the base. The internal face is made reflective by a metallising layer 2, formed, for example, by vacuum deposition. The metallising layer 2 is covered by a protective adhesive layer or label or by a coating of lacquer. The peripheral wall or rim 3 of the mirror has a height greater than the thickness of the base and greater than the minimum external radius permitted for the front edge. This minimum radius is currently 3.20 mm and is the outer radius of curvature of the rounded edge 4, shown in FIGS. 2 and 3, in this example. The thickness of the rim is substantially the same as that of the base 1, but other dimensions may be chosen, provided the rim imparts optical stability to the base 1 and does not cause distortion of the latter during moulding, after moulding or during use, for example as a result of change of temperature or humidity in the vicinity of the mirror.

Figure 2:
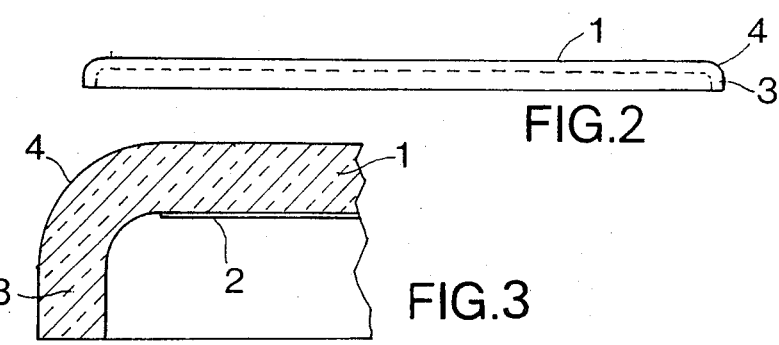
FIG. 2 is an edge view of the first mirror.
Figure 3:
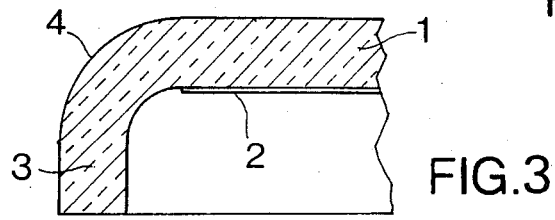
FIG. 3 is a section, to a greater scale, on the line III—III in FIG. 1.

In the mirror shown in FIGS. 1-3, it is the internal surface of the base of the tray which is metallised at 2, thereby providing second surface reflection through the base 1 from the front of the mirror, this being the upper face of the base with reference to FIGS. 2 and 3. Alternatively, for first surface reflection, the upper or external face of the base 1 may be metallised. In that case, the metallising layer would be protected by a layer of transparent lacquer or other transparent protective layer.

Figure 4:
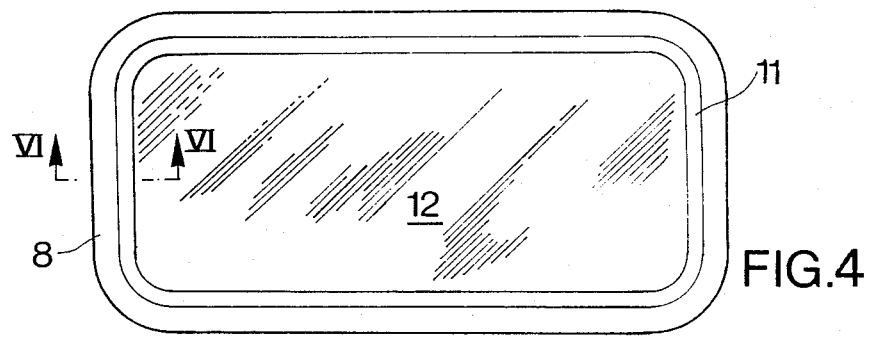
FIG. 4 is a plan view from the front of the second mirror.
Figure 5:
FIG. 5 is an edge view of the second mirror.
Figure 6:
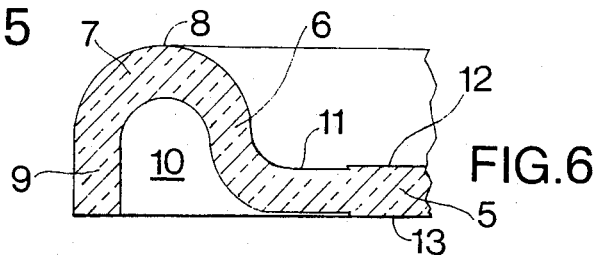
FIG. 6 is a section, to a greater scale, on the line VI—VI in FIG. 4.

Referring now to the second mirror shown in FIGS. 4-6, the mirror is again in the shape of a shallow tray or dish moulded from a plastics material. In this mirror, however, the upper face of the base as viewed in FIGS. 5 and 6 is the front of the mirror and the rim is defined by a first inner wall portion 6 which extends, upwardly as viewed in FIG. 6, from the base 5; a curved crest portion 7 on which the required minimum radius convex curve, of currently 3.20 mm. radius, is provided at 8, and a second outer wall portion 9 which is spaced from the first wall portion 6 to define an annular recess 10 in the back of the rim. The lower end of the second wall portion 9 is on substantially the same place as the lower surface of the base 5. The rim and the base 5 are an integral moulding and the thickness of material throughout the rim is substantially uniform and is the same as a marginal region 11 of the base 5. This particular cross-section through the rim and base of the mirror has been chosen as it imparts to the base 5 sufficient rigidity to maintain the base 5 free from distortion and so maintain the correct optical properties of the mirror. Specifically, the rim formation does not distort the base 5 during or after moulding or subsequently during use of the mirror, for example, during changes of temperature, or humidity in the vicinity of the mirror.

In the mirror illustrated, the central region of the base which is metallised is made slightly thicker than the marginal region 11 by providing in both the upper and lower surfaces a stepped portion 12 and 13, respectively. This slight thickening of the central region of the base 5 ensures that the base remains undistorted and so maintains the required optical properties of the mirror. In particular it ensures that a planar or slightly convex mirror does not distort to a concave shape, which would provide undesirable magnification and a limited field of view. The stepped portions 12 and 13 need not however be provided where the uniform thickness of the base 5 and the rim is sufficient to prevent the base from distorting. Alternatively, a stepped portion of required thickness may be provided on one only of the upper and lower surfaces of the base 5.

As in the first mirror, second surface reflection is produced by a metallising layer on the lower surface of the stepped portion 13. This would be protected by a covering layer, for example, a paper label. Alternatively, for first surface reflection, the upper surface of the stepped portion 12 would be metallised and this layer would be protected by a layer of a transparent lacquer or other transparent material.

The marginal region 11 is not metallised and so this provides a frame-like region, which can be made opaque, surrounding the reflective central region. The outside of the rim and at least a part of the marginal region 11 may be coated by a further decorative and/or resilient thicker layer, for example, PVC which may be moulded onto the rim.

Although the rim shown in FIG. 6 has a preferred cross-section which has been found not to cause distortion of the base 5 and so maintains the correct optical properties of the mirror, other rim sections may have a similar desired result.

What I claim as my invention and desire to secure by Letters Patent of the United States is:

1. A mirror made of a synthetic plastics material comprising: a base having front and back surfaces, which each define a plane, and a peripheral edge; a rim upstanding from said base around the whole of said peripheral edge; and a metallised layer on one of said front and back surfaces of said base to provide second or first surface reflection respectively; wherein said rim has a peripherally-inner wall portion extending forwardly from said base, a crest portion defining a front peripheral convex face having a radius of curvature greater than the thickness of said base, and a peripherally-outer wall portion spaced from said peripherally-inner wall portion and terminating in substantially the same plane as said back surface of said base, such that, together, the peripherally-inner wall portion, the crest portion and the peripherally-outer wall portion form a U-shape, the thickness of said rim extending substantially uniformly throughout said peripherally-inner wall portion, said crest portion and said peripherally-outer wall portion.

2. A mirror as claimed in claim 1 in which the thickness of said rim extends substantially uniformly throughout said rim and said base throughout the whole area of said base.

3. A mirror made of a synthetic plastics material comprising: a base having front and back surfaces, which each define a plane, and a peripheral edge; a rim upstanding from said base around the whole of said peripheral edge; and a metallised layer on one of said front and back surfaces of said base to provide second or first surface reflection respectively; wherein said rim has a peripherally-inner wall portion extending forwardly from said base, a crest portion defining a front peripheral convex face having a radius of curvature greater than the thickness of said base, and a peripherally-outer wall portion spaced from said peripherally-inner wall portion and terminating in substantially the same plane as said back surface of said base; wherein the thickness of said rim extends substantially uniformly throughout said peripherally-inner wall portion, said crest portion and said peripherally-outer wall portion; and wherein said base has a marginal portion adjacent said rim, the thickness of said rim and said marginal portion being substantially uniform throughout, and a remaining portion within said marginal portion which is thicker than said marginal portion and said rim, said remaining portion provided by a stepped forward front face extending throughout the whole area of said remaining portion of said base within said marginal portion.

4. A mirror made of a synthetic plastics material comprising: a base having front and back surfaces, which each define a plane, and a peripheral edge; a rim upstanding from said base around the whole of said peripheral edge; and a metallised layer on one of said front and back surfaces of said base to provide second or first surface reflection respectively; wherein said rim has a peripherally-inner wall portion extending forwardly from said base, a crest portion defining a front peripheral convex face having a radius of curvature greater than the thickness of said base, and a peripherally-outer wall portion spaced from said peripherally-inner wall portion and terminating in substantially the same plane as said back surface of said base; wherein the thickness of said rim extends substantially uniformly throughout said peripherally-inner wall portion, said crest portion and said peripherally-outer wall portion; wherein said base has a marginal portion adjacent said rim, the thickness of said rim and said marginal portion being substantially uniform throughout, and a remaining portion within said marginal portion which is thicker than said marginal portion and said rim; and wherein said remaining portion is provided by a stepped rearward rear face extending throughout the whole area of said remaining portion of said base within said marginal portion.

5. A mirror made of a synthetic plastics material comprising: a base having front and back surfaces, which each define a plane, and a peripheral edge; a rim upstanding from said base around the whole of said peripheral edge; and a metallised layer on one of said front and back surfaces of said base to provide second or first surface reflection respectively; wherein said rim has a peripherally-inner wall portion extending forwardly from said base, a crest portion defining a front peripheral convex face having a radius of curvature greater than the thickness of said base, and a peripherally-outer wall portion spaced from said peripherally-inner wall portion and terminating in substantially the same plane as said back surface of said base; wherein the thickness of said rim extends substantially uniformly throughout said peripherally-inner wall portion, said crest portion and said peripherally-outer wall portion; wherein said base has a marginal portion adjacent said rim, the thickness of said rim and said marginal portion being substantially uniform throughout, and a remaining portion within said marginal portion which is thicker than said marginal portion and said rim; and wherein said remaining portion is provided by a stepped forward front face and a stepped rearward rear face each extending throughout the whole area of said remaining portion of said base within said marginal portion.

* * * * *

UNITED STATES PATENT AND TRADEMARK OFFICE
CERTIFICATE OF CORRECTION

PATENT NO. : 4,530,571

DATED : July 23, 1985

INVENTOR(S) : John Connor

It is certified that error appears in the above-identified patent and that said Letters Patent is hereby corrected as shown below:

Column 3, 35th line, delete "place" and insert --plane--.

Signed and Sealed this

Eighth Day of April 1986

[SEAL]

Attest:

DONALD J. QUIGG

Attesting Officer

Commissioner of Patents and Trademarks